US005492093A

United States Patent [19]
Rygiel

[11] Patent Number: 5,492,093
[45] Date of Patent: Feb. 20, 1996

[54] FLUID DISTRIBUTING IN DUAL INTAKE MANIFOLDS

[75] Inventor: Ronald Rygiel, Auburn Hills, Mich.

[73] Assignee: Chrysler Corporation, Highland Park, Mich.

[21] Appl. No.: 299,977

[22] Filed: Sep. 2, 1994

[51] Int. Cl.6 ........................................ F02M 25/06
[52] U.S. Cl. ................................ 123/306; 123/568
[58] Field of Search ................................ 123/568, 570, 123/306, 184.31, 184.34, 184.35

[56] References Cited

U.S. PATENT DOCUMENTS

| | | | |
|---|---|---|---|
| 3,744,463 | 7/1973 | McFarland, Jr. | 123/184.34 |
| 3,930,473 | 1/1976 | McFarland, Jr. | 123/184.34 |
| 4,092,959 | 6/1978 | Mayer et al. | 123/119 A |
| 4,276,865 | 7/1981 | Hamai | 123/568 |
| 4,359,997 | 11/1982 | Lyssy | 123/592 |
| 4,401,081 | 8/1983 | Wessel et al. | 123/443 |
| 4,445,487 | 5/1984 | Higashi | 123/568 |
| 4,615,324 | 10/1986 | Choushi et al. | 123/184.36 |
| 4,640,256 | 2/1987 | Conrad et al. | 123/568 |
| 4,648,373 | 3/1987 | Noguchi et al. | 123/568 |
| 4,671,247 | 6/1987 | Barbee | 123/568 |
| 4,763,612 | 8/1988 | Iwanami | 123/184.36 |

Primary Examiner—David A. Okonsky
Attorney, Agent, or Firm—Kenneth H. MacLean

[57] ABSTRACT

Method and mechanism for distributing air and recirculating gasses into the cylinders of internal combustion engines involving left and right side throttle bodies connected to the branches of a common air intake for controlling inlet air fed to left and right side inlet manifolds. These two manifolds are longitudinally offset from one another so that the outlets of their runners are in alignment and can be readily attached to the head of the engine. With such construction and for space saving considerations the throttle body for the right side intake manifold is located close to an outlet of a crossover tube recirculating exhaust gas into this manifold and the inlet of an air supply runner of this manifold for feeding air to one of the cylinders. The utilization of inlet air flow trip tabs in connection with the right side throttle and the streams of air flowing therefrom effects air turbulence in the right side intake manifold immediately downstream of the throttle valve that prevents the formation of pressure pockets therein. This causes the recirculating exhaust gasses to properly mix with the intake air and prevents the premature feed of large volumes of recirculating exhaust gasses into the closely adjacent runner feeding air into the one cylinder. The left side throttle has a sufficiently long zip tube allowing the flow to become more uniform before entering the plenum so flow tripping tabs are not needed.

3 Claims, 3 Drawing Sheets

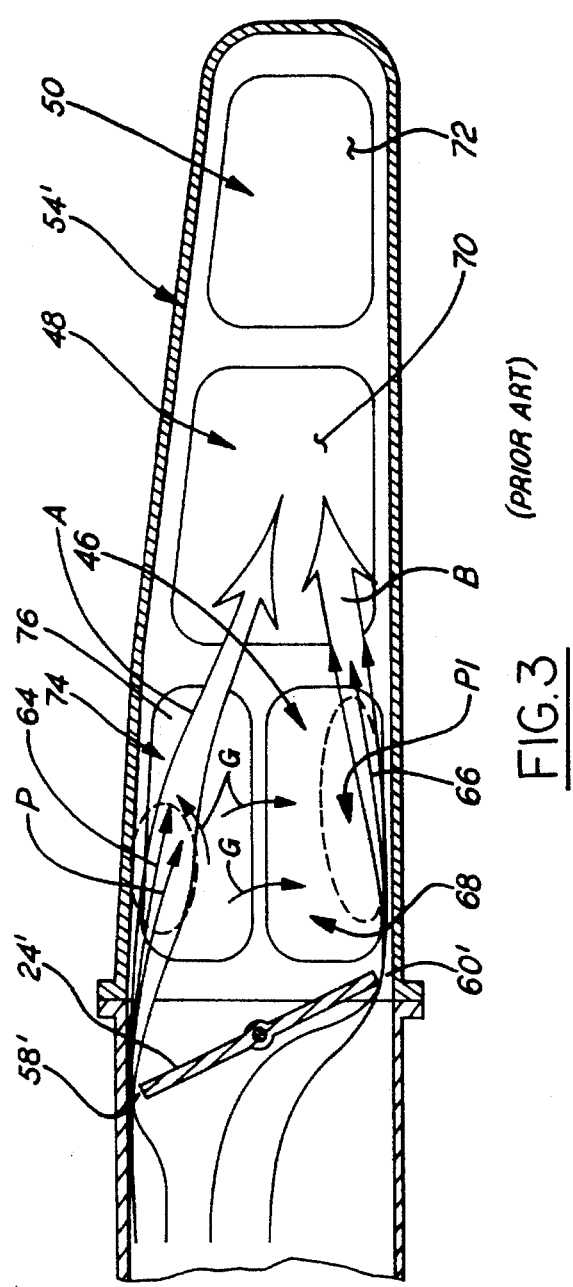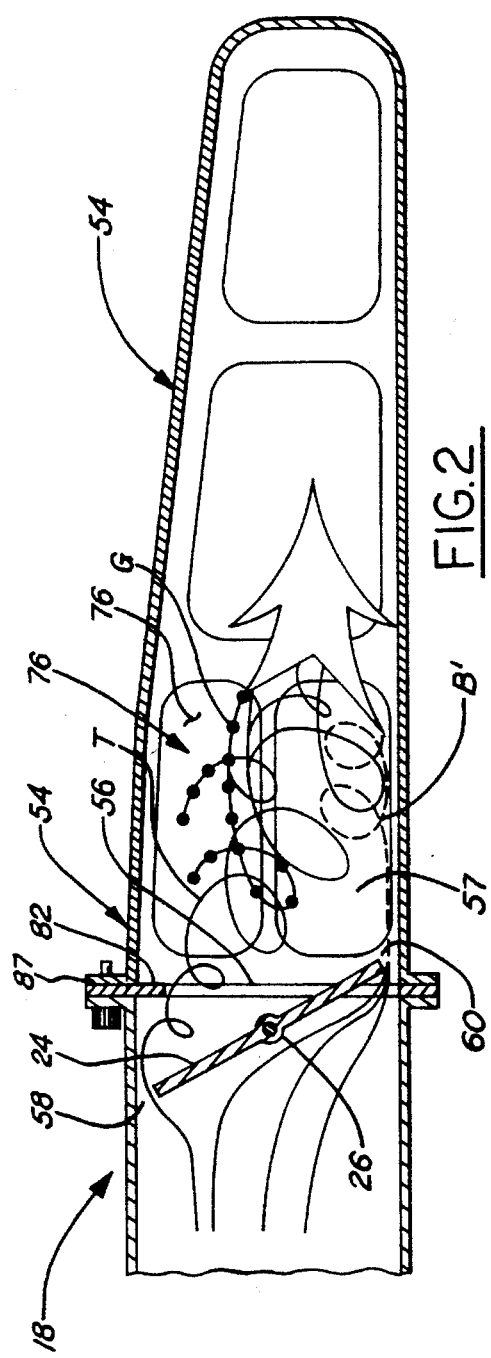
FIG.3 (PRIOR ART)
FIG.2

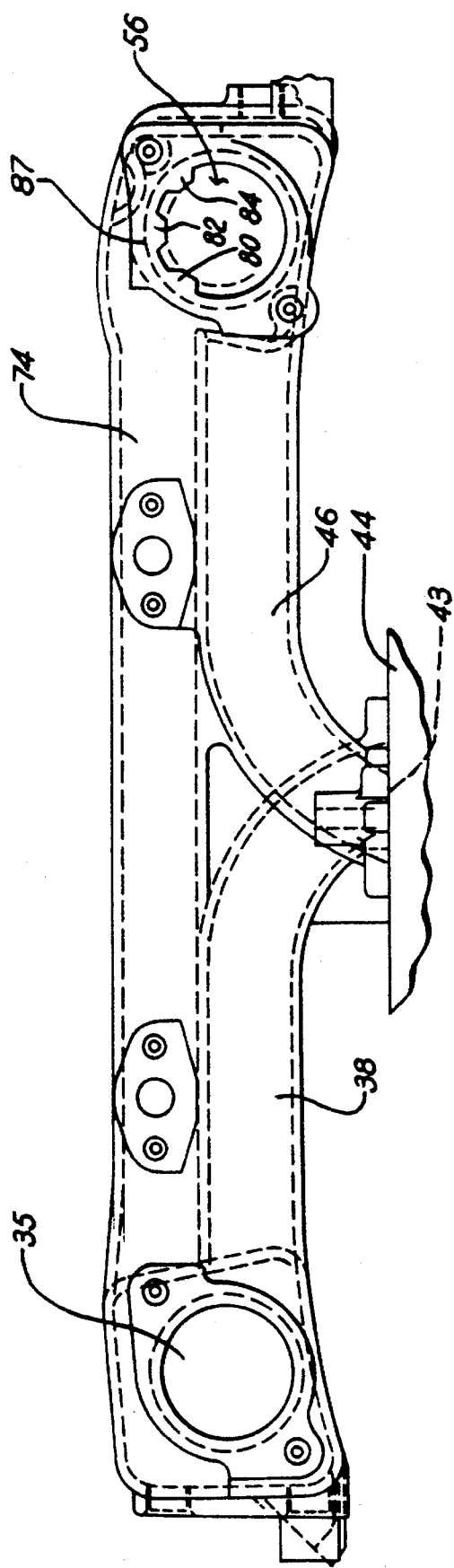
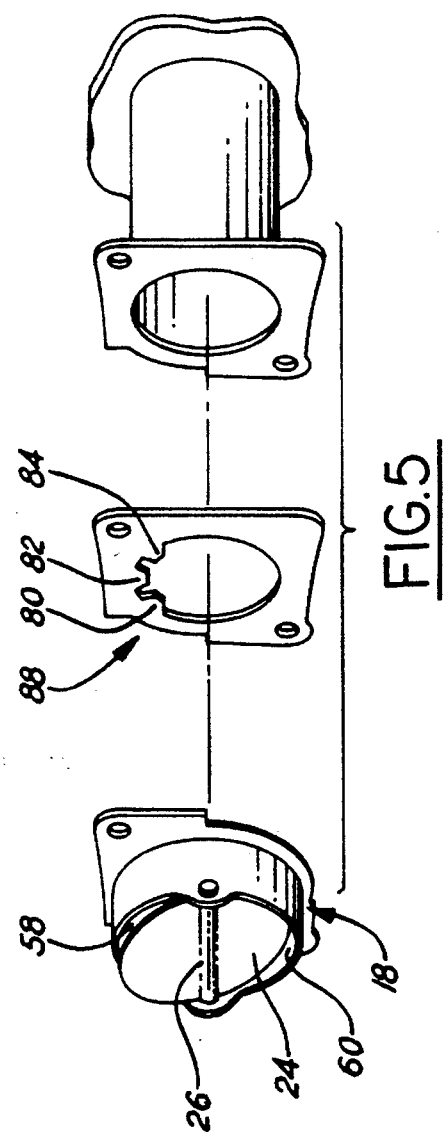

FLUID DISTRIBUTING IN DUAL INTAKE MANIFOLDS

BACKGROUND OF THE INVENTION

This invention relates to methods and mechanisms for effectively mixing ambient air and recirculating exhaust gasses in an intake manifold of an internal combustion engine for improving the distribution of recirculating exhaust gasses to the combustion chambers of the engine and thereby improving overall engine performance.

DESCRIPTION OF RELATED ART

Prior to the present invention, various constructions and methods have been employed to vary the flow of gasses in the intake manifold of internal combustion engines. For example, in U.S. Pat. No. 3,930,473 for "Manifold For Internal Combustion Engines Having Steps In The Walls of the Manifold Runners", issued Jan. 6, 1976, a series of inwardly protruding steps are provided on the internal wall of the air-fuel feed runners proximate to the outlet thereof and near the inlet ports of the engine. These steps provide barriers and energy dissipators directly in the flow path for reducing reverse air flow from the engine through the intake runners to the carburetor so that engine emission performance and economy is not compromised. In U.S. Pat. No. 3,744,463 for "Intake Manifold For Internal Combustion Engines Having A Sudden Enlargement In The Flow Path of Each Runner" issued Apr. 2, 1971, a stepped shoulder is provided near the entrance of each runner to improve manifold efficiency by isolating the pressure pulses which occur in the induction system acting in opposition to desired fluid flow in the intake manifold to the intake valve in the engine.

While the construction and methods of these patent disclosures concern the flow thorough intake manifolds, they are not capable of effecting the proper mixture of intake air with recirculating exhaust gasses (hereinafter at times referenced as EGR) so that there is improved homogenization of such intake air and egr prior to their intake into the runners to effect improvement in overall engine operation.

It has been found in many engine operations and during part throttle operation, air is forced, i.e., drawn through the small crescent moon shaped openings on opposing sides of the throttle plate. Part of the intake air passing the throttle plate separates and flows in two narrow, high-velocity and localized areas immediately downstream of the throttle plate for mixing with EGR being routed into the intake manifold. The mixture of intake air with recirculating exhaust gas is subsequently distributed to the intake runners and the intake valves of the engine. However, pressure differentials occurring in the localized areas created by the high velocity flows usually results in poor mixing of recirculating exhaust gasses with intake air and causes larger amounts of EGR to be supplied to one or more of the runners and the associated intake valves of the engine than are supplied to other runners and engine intake valves. As a consequence of such uneven EGR distribution, engine operation may be rough and engine operating efficiency is reduced.

In the preferred embodiment of this invention, one or more air tripping and distribution tabs are arranged at or near the inlet of the intake manifold and downstream of the disc-like throttle plate in the throttle valve. These tabs are engineered to eliminate or substantially reduce the pressure/velocity fields or areas normally created by high-velocity air flows across a throttle plate angled between 20–45 degrees, for example. The tabs effectively trip a first of the two high velocity and generally laminar air streams with about 180° separation therebetween after passing the throttle plate openings. With such tripping, the flow separates from the throttle body wall and becomes turbulent. The turbulent air further extends to the second air stream so that it becomes turbulent and its velocity decreases to a point where pressure pocket formation is disrupted, or, eliminated. Accordingly, pressure differentials are eliminated or sharply reduced so that the EGR gasses and fresh air are effectively mixed in the intake manifold before distribution to any of the air intake runners.

In the preferred embodiment, the air intake manifold construction for a 6-cylinder 3.5 L engine has left and right side throttle bodies connected to the branches of a common air intake for controlling the feed of fresh or inlet air to left and right side air inlet manifolds. These two manifolds are longitudinally offset from one another so that the outlets of their runners are in alignment and can be readily attached to the head of the engine. With such offset and for compactness, the throttle body of the right side is located close to an outlet of an exhaust gas recirculating crossover tube and the inlet of the inlet air supply runner feeding air to one of the cylinders. The utilization of air flow trip tabs in connection with the right side throttle prevents or disrupts the formation of pressure pockets so that EGR gasses are mixed with the intake air and are not prematurely drawn into the closely adjacent runner. The left side throttle has a sufficiently long zip tube that spaces the throttle valve from the left side intake manifold allowing the flow to become more uniform on entering the plenum of the intake manifold air so pressure pockets are not developed to modify EGR and fresh air mixing, and accordingly, flow tripping tabs are not needed.

This invention provides for the improved mixing of recirculating exhaust gasses with intake or ambient air so that none of the cylinders will be overburdened by such gasses and none will be starved for intake air. This invention further provides for the formation and delivery of a more uniform mixture of exhaust gas and intake air to each of the cylinders of an internal combustion engine so that engine operation will be improved.

These and other features, object and advantages of this invention will become more apparent from the following detailed description and drawings in which:

DESCRIPTION OF THE DRAWINGS

FIG. 2 is a diagrammatic view of a cross section of FIG. 1 taken generally along sight lines 2—2 thereof illustrating one preferred embodiment of this invention and its operation;

FIG. 3 is a view similar to the view of FIG. 2 but without air trip tabs of FIG. 2;

FIG. 4 is a cross sectional view taken generally along lines 4—4 of FIG. 1; and

FIG. 5 is an exploded pictorial view of portions of a throttle valve, an intake manifold and a gasket therebetween incorporating air trip tabs of this invention.

DETAILED DESCRIPTION OF THE DRAWINGS

Figure 1:
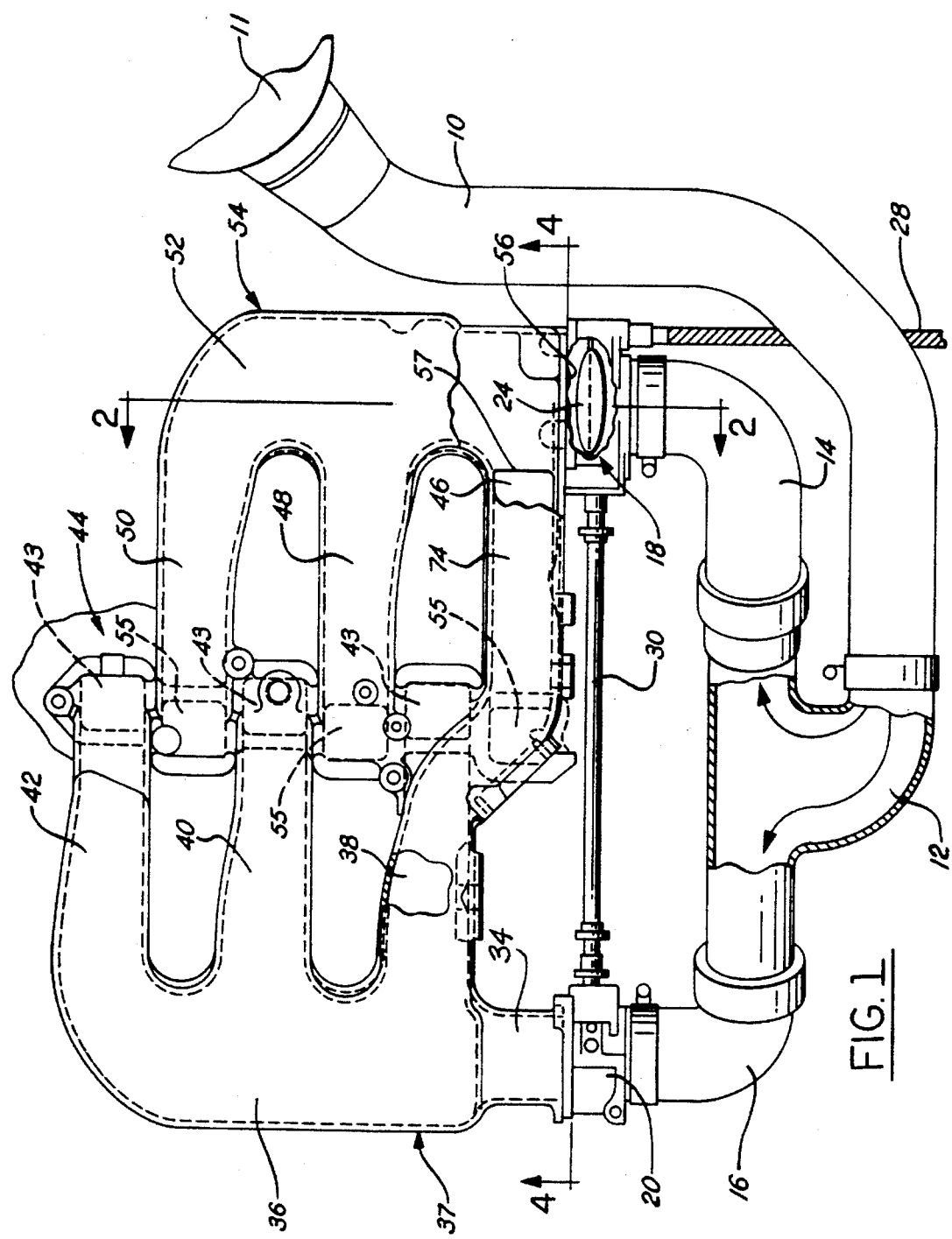
FIG. 1 is a top elevational view partially broken away of an intake air distribution system for an internal combustion engine including a pair of throttle bodies and their associated intake manifolds.

Turning now in greater detail to the drawings, there is shown in FIG. 1 an air intake pipe 10 leading from ambient air through an air cleaner unit 11 into connection with a divider tube 12 that separates the ambient or intake air for transmittal by generally L- shaped right and left side connector tubes 14 and 16. These tubes are secured by hose clamps to the entrance ends of right and left hand side throttle units 18 and 20 which are substantially identical, each with a circular flat throttle plate 24 pivoted in the bore or opening extending through the throttle body by pivot pin 26 fixed to the plate.

The pivot pin 26 of the throttle plate 24 is operatively connected by actuating structure including cable 28 to a foot pedal in the occupant compartment of the vehicle so that the vehicle operator can easily vary and select throttle opening for desired vehicle operation. The right hand throttle valve plate is operatively connected with the left hand throttle valve plate by linkage which includes a straight and forwardly located connector shaft 30 so that each of the throttle plates move simultaneously to the same angle as selected by the vehicle operator.

The outlet end of the left hand throttle valve unit 20 is connected by a cylindrical zip tube 34 to transmit intake air into the plenum 36 of the left side intake manifold 37. The zip tube 34 can be a separate cylindrical part or an integral part of the manifold casting as illustrated. This manifold has laterally spaced air feed runners 38, 40, 42 that extend inwardly to terminal ends that connect into spaced air intakes 43 in the head 44 of the engine to feed air into three of the six cylinders of this engine. Interleaved with the terminal or discharge ends of the left hand runners are the discharge ends of laterally spaced runners 46, 48, 50 leading from the plenum 52 of the right side manifold 54. These runners feed air into the spaced air intakes 55 for the other cylinders of the engine.

Since the runners are interleaved with one another, the left hand side intake manifold 37 is offset forwardly from the right hand side manifold by a distance equal to the width approximating that of one of the runners. With such construction there is no zip tube connecting the air inlet 56 of the right hand intake manifold 54 to the outlet of the throttle valve unit 18 as is the case with the left hand manifold and the left side throttle valve. Accordingly, the throttle plate 24 of the right hand throttle unit is closely adjacent to the air intake 57 of runner 46 of the right side intake manifold.

Such construction is diagrammatically shown in FIG. 2 where it will be seen that the throttle valve is set by the throttle control at an angle in a 20–45 degree range in the valve body. With such setting, streams of air flow through the two crescent moon shaped openings 58 and 60 formed by the convex top and bottom edges of the throttle plate and the associated concave sides of the cylindrical bore in the valve body forming the air passage therethrough.

In the constructions before this invention, shown in FIG. 3, air flowing through corresponding crescent moon openings 58', 60' on either side of the throttle plate 24' are primarily in the form of top and bottom streams 64, 66 of intake air. These streams are mostly laminar and flow into the plenum for delivery to the air inlet openings 68, 70, 72, respectively, for the runners 46, 48 and 50 that separately lead to three of the combustion chambers of the engine. As shown in FIG. 3, an exhaust gas recirculation passage 74 has an outlet 76 which is in very close proximity to the air inlet of the runner 46 which, for example, provides the air for combustion chamber of the #6 engine cylinder.

With the throttle plate angled and set for part throttle engine operation, such as shown in FIG. 3, a stream of air A will flow at high velocities that progressively diminish in magnitude as it flows in the plenum from a furthermost (with respect to the plenum) and upper throttle opening 58' as provided by the forward tilt angle of the throttle plate 24'. This stream and flow of fresh air mixes with some of the exhaust recirculating gasses G and the mixture feeds into the intakes of the runners 46, 48 and 50. Stream A also creates a low pressure area diagrammatically shown as area P where air velocity is very high near the outlet 76 of the EGR tube or passage 74. Furthermore, a second stream B of fresh air will flow at high velocities that progressively diminish in magnitude as it mixes with some of the exhaust gasses and flows in the plenum to the runner opening from a closer and lower throttle opening 68'. A second low pressure area diagrammatically shown as area P-1 is established below the EGR outlet 76 and at the inlet 57 of the runner 46. The pressure in area P-1 is substantially lower than in the upper area P since the air stream velocities in this area being close to the throttle opening 68' are greater than velocities of the air flowing in area P. Also, the engine cylinder associated with runner 46 draws in air on intake stroke to reduce pressure. In any event, when these pressure differentials occur the recirculating exhaust gasses exiting from EGR outlet 74 readily dump over into the lower pressure area P-1 and into inlet 68 of the runner 46. Under such circumstances the dumped EGR gasses do not have the opportunity to appropriately mix with the fresh air being drawn across the throttle plate and into the plenum for supply to the runners 46, 48 and 50. With a large percentage of the EGR gasses dumping into runner 46, these gasses are not mixed with the outside air flowing past the throttle plate 24. The cylinder #6 connected to runner 46 is fed with excessive amount of EGR and in effect starved for fresh intake air while the runners 48, 50 for cylinders #4 and #6 are not supplied with the quantities of EGR gasses for which they were designed. With excessive EGR overload in cylinder #6, combustion and operation is compromised and cylinder #6 will not run as efficiently and effectively as cylinders #2 and #4 so that its efficiency and the overall efficiency of the engine is reduced.

Contrary to the flow pattern and operation of the right hand intake manifold, the left hand intake manifold 37 does not experience problems in the mixing and distribution of intake air and recirculating exhaust gasses. This is primarily because the zip tube 34 places the throttle plate 24 sufficiently far upstream of the exhaust gas recirculation passage and the air intake runner 38 for the cylinder #5 and the EGR exhaust passage extending above this runner. With the left hand side air intake manifold spaced by the zip tube at a distance from the inlet of the plenum, the intake air passes the throttle plate and the two high velocity inlet flows are well upstream of the EGR outlet and the inlet of runner 38 so that no adverse pressure areas are generated and the EGR gas entering the plenum can readily mix with inlet air so that there is appropriate mixing of the recirculating exhaust gas and the intake air and the appropriate distribution of such mixture to the three runners 38, 40, 42 for these cylinders.

FIGS. 2, 4 and 5 show the air at tripping tabs 80, 82, 84 arcuately spaced from one another which can be either an integral part of the connector flange 87 right side intake manifold 54 or as a separate gasket 88. In either case, the tabs extend ratedly inward from the inner diameter of the flange 87 or the gasket 88 from the air entrance into the plenum. With these tabs, air flowing past the crescent shaped opening 58 at the top of the throttle plate 24 is tripped so that it becomes turbulent, as diagrammatically illustrated by swirling flow path T. With such turbulence, some of which is directed downwardly by the upper and radially spaced tabs 80, 82, 84 to extend down to the lower wall of the plenum. This flow will disrupt any high velocity flow B' from lower opening 60 so there are no pressure pockets and pressure differentials built up on the plenum and the EGR gasses G readily mix with the turbulating air T flowing deeper into the plenum and into the runner openings for the three engine cylinders associated with manifold 54.

Accordingly, with the tabs formed directly into the intake manifold, as shown in FIGS. 2 and 4, or in the separate gasket design, shown in FIG. 5, intake air flow is tripped into a more turbulent state so that pressure pockets are eliminated or materially reduced and there is no dumping of EGR gas into the first runner even though the runner is close to the EGR outlet. Accordingly, with this invention no air starvation occurs. Also, with this invention the EGR gasses are more evenly mixed with intake air so that such gasses are more evenly distributed to all six cylinders and not dumped into any particular runner and cylinder. The combustion chambers of the cylinders will be evenly charged for firing for improved burns of unburnt hydrocarbons still remaining in the exhaust gas. Accordingly with this invention, the improved air distribution results in cleaner burning, improved horsepower and torque output.

While preferred embodiments of the air tripping construction and methods are disclosed, other constructions and methods could be readily used in general application in any engine where a throttle body is mounted close to the runners and EGR outlets. The configuration, spacing and number of tabs of this invention can be varied for other installations to materially improve the distribution of air that passes through the throttle valve to make the mixture of EGR gasses and fresh air more uniform in the plenum for delivery to the cylinder. The invention is of particular importance where tight packaging occurs and where the throttle is close to the runner. This invention is of particular significance where there is too much recirculating exhaust gasses entering into one or more of the runners.

Other equivalent embodiments and methods will now become apparent to those skilled in the art which equivalents and embodiments are encompassed by the following claims:

What is claimed is:

1. An intake manifold for mixing ambient air with recirculating internal combustion engine exhaust gasses and for distributing the mixture through separate runners of the manifold to associated combustion chambers of the engine comprising an inlet for receiving ambient air passing an angularly adjustable throttle plate of a throttle valve associated with and operatively connected to said inlet of said intake manifold, and wherein said throttle plate is angled to a part throttle position so that separate streams of high velocity air pass over opposing edge portions of the plate, an air tripping mechanism associated with said inlet for causing the detachment of air from adjacent walls thereof and turbulence in the air downstream of the inlet, an exhaust gas recirculation passage having an outlet in the area of the turbulence, one of said runners comprising a first air feed passage adjacent to the outlet of said exhaust gas recirculation passage, said turbulence extending across the exhaust gas recirculating outlet and the inlet to said first air feed passage to prevent the establishment of low pressure areas in the manifold so that gasses discharged by said exhaust gas recirculating passage do not dump into said first air feed passage and thereby allowing the recirculating exhaust gas to mix with said inlet air so that said mixture will be distributed to all of the inlet runners.

2. The intake manifold of claim 1, wherein said air tripping mechanism comprises a plurality of arcuately spaced tabs integrally formed in said inlet to trip air flowing from the throttle valve into said manifold.

3. The intake manifolds of claim 1, wherein said air tripping mechanism comprised a plurality of arcuately spaced and inwardly extending teeth in a gasket disposed between said throttle valve and said inlet of said manifold.

* * * * *